Figure 1:
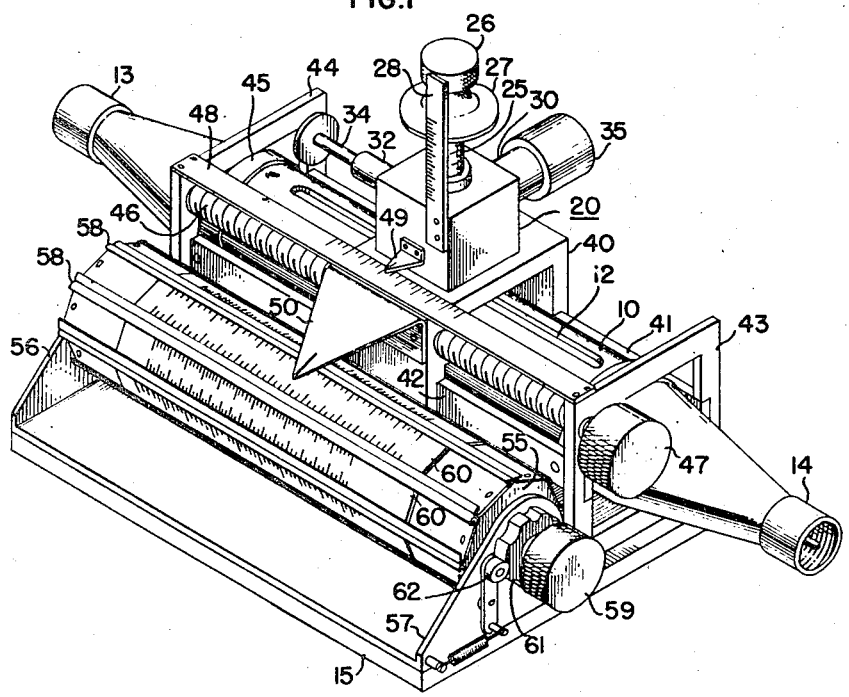

Nov. 16, 1948.     D. DETTINGER     2,454,042
STANDING-WAVE MEASURING APPARATUS
Filed Jan. 18, 1945     2 Sheets-Sheet 1

*INVENTOR.*
DAVID DETTINGER
BY Harry C. Page
ATTORNEY

Nov. 16, 1948.   D. DETTINGER   2,454,042
STANDING-WAVE MEASURING APPARATUS
Filed Jan. 18, 1945   2 Sheets-Sheet 2

INVENTOR.
DAVID DETTINGER
BY
ATTORNEY

Patented Nov. 16, 1948

2,454,042

UNITED STATES PATENT OFFICE 2,454,042

STANDING-WAVE MEASURING APPARATUS

David Dettinger, Little Neck, N. Y., assignor, by mesne assignments, to Hazeltine Research, Inc., Chicago, Ill., a corporation of Illinois Application January 18, 1945, Serial No. 573,436

9 Claims. (Cl. 171—95)

This invention is directed to standing-wave measuring apparatus and is especially suited for use in determining the magnitude and phase characteristics of an impedance over a desired range of ultra-short waves.

Arrangements of the general type under consideration are known in the art. They usually comprise a coaxial transmission line having a slotted outer conductor and terminal connectors for coupling a short-wave signal generator and an impedance at opposite ends of the line. A pick-up device projects through the slotted conductor so as to be coupled electrically to the line to derive signal voltages indicative of the standing-wave pattern established along the line for any given loading condition and operating wave length. A centimeter scale is scribed into the outer conductor to register with an indicator of the pick-up device and indicate the position or extent of movement of the pick-up device along the transmission line.

In utilizing the described arrangement, the line is initially terminated in a known impedance such as a short circuit. The signal generator is adjusted to a desired operating wave length and the probe is moved along in the slot to locate a reference point of the resulting standing wave established on the line. This reference point may correspond with a current or voltage maximum or minimum, a voltage minimum being selected in many cases. After the reference point has been located, the position of the pick-up device is noted on the centimeter scale and the line is then terminated in an unkown impedance, the characteristics of which are to be determined. The new loading condition produces a new standing wave along the line and the pick-up device is adjusted to locate the corresponding minimum or maximum of the new pattern. The displacement of the pick-up device is measured by means of the centimeter scale and converted into electrical degrees, representing the phase shift along the line due to the change in loading. The pick-up device is also adjusted to determine the magnitude of the standing-wave ratio established along the line by the unknown impedance. The phase shift and standing-wave ratio, thus measured, may be utilized in a known manner to compute the magnitude and phase characteristics of the unknown impedance at the wave length used in making the measurements.

Prior art arrangements of the above-mentioned type have proved to be operative, but they are inconvenient in that the angular phase shift following a change in line-loading must be computed. This limitation has been overcome in other measuring apparatus which utilizes scales, calibrated in electrical degrees for particular operating wave lengths and adapted to be fastened to the line adjacent the slot in its outer conductor. Where such scales are used, the reference point of the standing-wave pattern for a known loading condition is located in the manner recited above and the appropriate wave length scale is affixed to the line in proper registration with this reference point. Any subsequent displacement of the pick-up device is then directly readable in electrical degrees. However, these other arrangements are also inconvenient when the characteristics of the unknown impedance are to be determined at a plurality of wave lengths because the wave length scale must be removed from the line and another put in its place with each change in operating wave length.

It is an object of the present invention, therefore, to provide a standing-wave measuring apparatus which avoids one or more of the above-mentioned limitations of prior art arrangements.

It is another object of the invention to provide an improved standing-wave measuring apparatus for making measurements conveniently over a desired range of ultra-short wave lengths.

It is a specific object of the invention to provide an improved standing-wave measuring apparatus having a simplified and inexpensive mechanical construction and adapted to make measurements conveniently over a range of ultra-short wave lengths.

In accordance with the invention, a standing-wave measuring apparatus comprises a guide for electromagnetic waves which is effective to establish a standing electric wave along its length in accordance with the load condition and operating wave length of the guide. A pick-up device is electrically coupled to and supported for axial movement with reference to the guide for deriving a voltage indicative of the amplitude of the standing wave at any selected point along the length of the guide. The apparatus includes an arrangement for providing in the vicinity of the guide a plurality of scales each of which is individually movable for longitudinal adjustment thereof and is calibrated in terms of a different operating wave length of the guide. Additionally, there is provided in the apparatus means for so positioning and orienting the scale providing arrangement with reference to the guide that any selected one of the scales is positioned for movement during adjustment thereof in a predetermined path parallel to that of the pick-up device.

For a better understanding of the present invention, together with other and further objects thereof, reference is had to the following description taken in connection with the accompanying drawings, and its scope will be pointed out in the appended claims.

Figure 4:
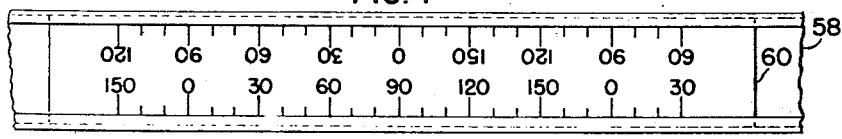
Figure 2:
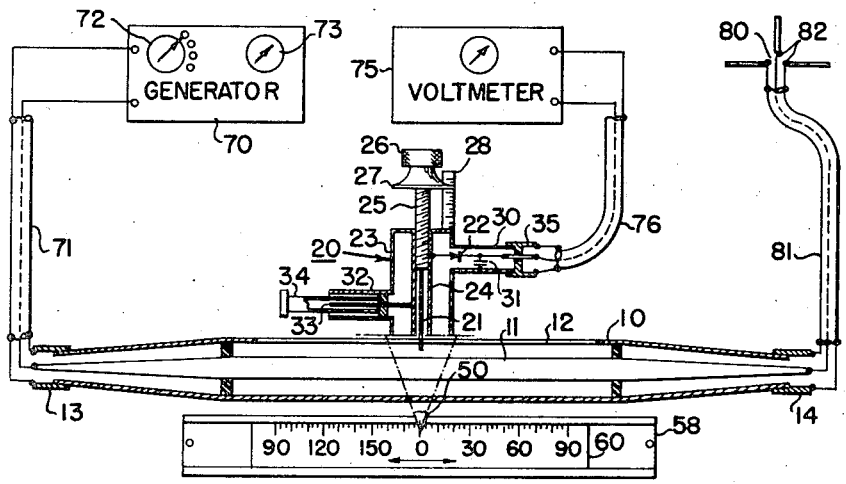
Figure 3:
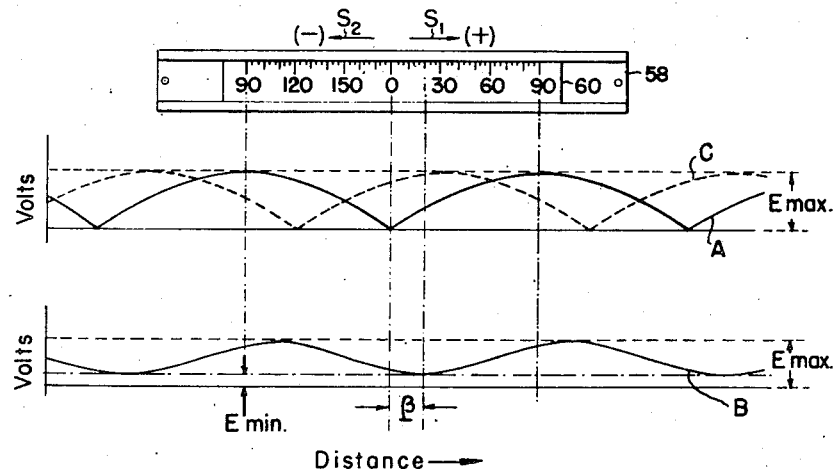

In the drawings, Fig. 1 is a perspective view of a standing-wave measuring apparatus embodying the present invention; Fig. 2 is a schematic cross-sectional view of a portion of the apparatus and shows connections thereto required for making standing-wave measurements; Fig. 3 includes graphs used in explaining the operation of the apparatus; and Fig. 4 is an enlarged view of a wave length scale for use in the apparatus.

Referring now more particularly to Fig. 1 and the schematic cross-sectional portion of Fig. 2, the standing-wave measuring apparatus there represented comprises a guide for electromagnetic waves which is effective to establish a standing electric wave along its length in accordance with its load condition and operating wave length. For the illustrated embodiment, this guide is in the form of a coaxial transmission line and will be referred to as such throughout the remainder of this description. The transmission line is provided by an outer conductor 10 and a coaxially aligned inner conductor 11, the diameters of these conductors being so selected that the coaxial line formed thereby has a desired characteristic impedance. The central portion of the described transmission line is in the usual form of concentric cylinders but at either end the line is tapered to accommodate coaxial connectors 13 and 14 through which connections may be conveniently made with the line while preserving a uniform characteristic impedance. A longitudinal slot 12 is milled in the outer conductor 10 and preferably has a length at least as long as one-half of any desired operating wave length of the apparatus. The coaxial line is supported upon a base plate 15 in a manner to be described presently.

The apparatus includes, within an assembly indicated at 20, a probe or pick-up device electrically coupled to and supported for axial movement with reference to transmission line 10, 11 for deriving a voltage indicative of the standing wave at any selected point along the length of the line. As shown in Fig. 2, unit 20 includes a probe 21 projecting through slot 12 of conductor 10 so as to be capacitively coupled with the line 10, 11. The probe is associated with a crystal detector 22 through a short-circuited coaxial transmission-line section. This section consists of an outer conductor 23, provided by the housing of unit 20, and a tubular inner conductor 24 through which probe 21 is vertically adjustable to vary the coupling between the probe and line 10, 11. To this end, probe 21 is supported by a threaded shaft 25 received by a tapped portion of conductor 24 and rotatable through a knurled knob 26. A portion of knob 26 is flared into an indicator 27 which registers with a scale 28 affixed to unit 20 for designating the depth of the probe within the slotted line.

Detector 22 is housed within a projection 30 of unit 20 and has one terminal coupled to conductor 24 and an opposite terminal coupled through a condenser 31 to the shell portion 23 of unit 20. The detector circuit is tunable to the operating wave length of the apparatus by means of a well-known stub-line tuner connected in parallel relationship to outer section 23, 24. The tuning stub has an outer conductor 32 formed as a projection of the shell 23 of unit 20 and a coaxially aligned inner conductor 33 conductively connected to conductor 24. A tuning plunger 34 short-circuits the tuning stub to tune the detector circuit over a range of operating wave lengths in the usual manner. The signal output of the detector is obtained at a coaxial connector 35 which terminates projection 30.

Probe assembly 20 is supported for movement along line 10, 11. For this purpose, the assembly is mounted upon a frame 40 which is slidably supported upon a pair of bars 41 and 42. Bars 41 and 42, in turn, are secured to a pair of frame members 43 and 44, affixed to base plate 15 and suitably apertured to receive the end portions of transmission line 10, 11. A threaded shaft 46 is rotatably supported by frames 43 and 44 and engages a threaded bushing provided in frame 40. The control of this shaft by means of an adjusting knob 47 displaces the probe assembly 20 longitudinally of line 10, 11, thereby providing controlled movement of the probe 21 along slot 12. A scale 48 bridged between frame members 43 and 44 registers with a first indicator 49 secured to probe assembly 20, affording convenient means for determining the position of the probe within slot 12. A second indicator 50 is carried by probe assembly 20 to register with wave length scales described hereinafter. A pair of collars 45, one of which appears clearly in Fig. 1, is carried by line 10, 11 and secured to bars 41 and 42 in order to support the slotted line. Other supporting provisions for the line may be included in the apparatus, if desired.

The measuring apparatus also includes an arrangement or carriage 55 for adjustably supporting in the vicinity of the slotted line a plurality of scales. Carriage 55 is polygonal in cross section and has an axial length which, preferably, substantially exceeds the length of the line slot 12. The carriage is rotatably supported in a pair of brackets 56 and 57 affixed to base plate 15 to position the carriage in parallel relationship with line slot 12. A plurality of channel brackets 58, 58 is secured around the periphery of the carriage to define axially aligned, peripherally spaced, and longitudinally extending retaining means or channels for individually supporting a plurality of scales 60, 60 for individual longitudinal adjustment along the carriage. The channel width is so selected with reference to scales 60 that each scale is movable laterally of itself and is frictionally engaged by its supporting channel, thereby to be supported in adjustably fixed longitudinal positions along the carriage.

Each of scales 60 is calibrated in terms of a different operating wave length of transmission line 10, 11. That is to say, the calibration marks of any particular scale represent fractions of a wave length or the equivalent number of electrical degrees for a particular operating wave length of the line. The scale calibration is directly related to the velocity of wave propagation through line 10, 11 which determines the operating wave length of any signal of a particular frequency which is applied to the line. The calibrations of each scale extend over a distance corresponding to at least one-half of the particular operating wave length.

There is also provided means for so orienting the carriage 55 with reference to line 10, 11 that any selected one of its scales is adjustably positioned for movement in a predetermined path parallel to that of the probe assembly 20. This means comprises a control knob 59 affixed to one end of the supporting shaft of carriage 55. Adjustment of knob 59 orients the carriage as required to position a particular scale for registration with probe indicator 50 and for adjustable movement parallel to slot 12 and parallel to the movement of probe 21. A detent mechanism, including a cam element 61 and a co-operating spring-pressed roller 62, constitutes means for locking carriage 55 against movement to maintain a preselected orientation between the carriage and the line.

In considering the operation of the described apparatus for making impedance measurements over a range of ultra-short wave lengths, reference is made to the schematic diagram of Fig. 2 and the curves of Fig. 3. To make such measurements a signal generator 70 is coupled to one terminal of the line 10, 11 through a cable section 71, preferably having a characteristic impedance equal to that of the slotted line. A control 72 facilitates adjusting the operating wave length of generator 70 and an additional control 73, which may be an attenuator, permits the intensity of the signal output of the generator to be adjusted. A voltmeter 75, which may include associated stages of amplification, is coupled to the output circuit of the detector included in probe assembly 20 through an additional cable section 76. The remaining terminal 14 receives the load or the impedance to be coupled to the line 10, 11. In Fig. 2, an antenna system 80 having input terminals 82 is illustrated as the impedance to be measured. It is coupled to terminal 14 through a cable section 81, preferably having a characteristic impedance equal to that of the slotted line.

Let it be assumed that the impedance characteristics at the input terminals 82 of the antenna 80 are to be measured over a desired range of ultra-short wave lengths. The procedure for making this measurement at a particular wave length will be described, it being understood that the same procedure is to be followed in measuring the impedance at each wave length within the desired range. Initially, control 72 of generator 70 is adjusted to establish a desired operating wave length. Carriage 55 is then rotated by means of control knob 59 to bring into registration with indicator 50 that scale 60 which is calibrated in terms of the selected operating wave length. The antenna output terminals 82 are then terminated in a known impedance to establish a reference loading condition on line 10, 11. The most satisfactory known loading conditions for the line are those of short circuit or open circuit. In the case under consideration, it will be assumed that the short-circuit condition is established by applying a direct short across antenna terminals 82. Tuning control 34 is thereupon adjusted to tune the circuit of detector 22 to the selected operating wave length so that a maximum response is obtained from the detector circuit.

Having established the required initial conditions, probe assembly 20 is displaced along slot 12 to supply to meter 75 voltages which vary in accordance with the amplitude variations of the standing-wave pattern established along the line for the short-circuited loading condition and selected operating wave length. The standing-wave pattern may be represented by full-line curve A of Fig. 3. It will be seen to have recurrent points of voltage maximum and voltage minimum either of which may be termed a reference point of the pattern. Through the readings of voltmeter 75 a reference point corresponding to a voltage minimum is located. The wave length scale 60 is then adjusted longitudinally of its carriage 58 to bring its zero-degree calibration mark in registration with indicator 50, as illustrated in Figs. 2 and 3.

The short circuit is now removed from terminals 82, leaving line 10, 11 terminated in the unknown impedance to be measured, in this case the antenna 80. The new loading condition of the line establishes a new standing-wave pattern therealong, which may be as represented by curve B of Fig. 3. This pattern is similar to that of curve A insofar as each includes corresponding points of voltage maximum or minimum. The probe assembly 20 is adjusted longitudinally of slot 12 to locate the voltage minimum of the new pattern. During this adjustment of the probe assembly, the wave length scale 60 remains fixed due to its frictional engagement with channel 58. Therefore, the line phase shift or the displacement B of the selected minimum point of the standing-wave pattern with changes in line loading may be directly read from scale 60. For the case under consideration, the voltage minimum is displaced approximately twenty electrical degrees when the antenna impedance replaces the short-circuit condition of the line 10, 11. After the line angle shift has been determined, probe assembly 20 is moved along slot 12 and the readings of voltmeter 75, corresponding to the maximum and minimum values of the standing-wave pattern of curve B, are noted.

The standing-wave measurements, namely the phase shift in the standing-wave pattern with line loading and the minimum and maximum values of the standing-wave pattern established by the unknown impedance, may be utilized in several ways to determine the magnitude and phase of the unknown impedance. For example, the desired information may be computed, as outlined in the following expressions wherein:

Q = standing-wave ratio $$\left(\frac{E_{max}}{E_{min}}\right)$$

established by the unknown impedance;

$\beta$ = shift in electrical degrees of the reference point of the standing-wave pattern (positive for shifts in the direction of the line load, as indicated by arrow $S_1$ in Fig. 3, and negative for shifts in the opposite direction, indicated by arrow $S_2$;

$\theta$ = phase shift of the reflection coefficient;
$k$ = magnitude of the reflection coefficient;
$K$ = reflection coefficient as a vector quantity;
$Z_0$ = characteristic impedance of transmission line 10, 11 as a vector quantity;
$Z_1$ = impedance of the unknown impedance as a vector quantity $$k = \frac{Q-1}{Q+1} \quad (1)$$

$$\theta = 180° - 2\beta \quad (2)$$

$$K = k \angle \theta \quad (3)$$

$$\frac{Z_1}{Z_0} = \frac{1+K}{1-K} \quad (4)$$

Substitution in the above-recited expressions determines both the magnitude and phase of the unknown impedance at the selected operating wave length.

The measuring apparatus with suitably calibrated wave length scales provides the line angles and standing-wave ratios required to determine the magnitude and phase of an unknown impedance with the aid of conversion charts. One chart that may be used for this purpose is the Hemisphere Chart, copyright 1942, Hazeltine Service Corporation. A similar chart is disclosed in an article entitled "Charts for transmission-line measurements and computations" by P. S. Carter, RCA Review, January 1939, volume III, Number 3, page 355.

The described apparatus is especially valuable in the construction of an antenna system which is required to have a particular impedance characteristic over a given wave length range. In making measurements over a range, scales 60 may be advantageously positioned on carriage 55 in a regular wave length sequence. As illustrated in Fig. 1, the scale in registration with indicator 50 corresponds to the longest operating wave length of the range over which measurements are to be made. The remaining scales are positioned on the carriage so that in rotating the carriage the wave length scales vary in a desired progression, say, from the longest to the shortest. Following the procedure recited above, each scale is adjusted within its retaining channel 58 so that its zero calibration point represents the selected reference point of the standing-wave pattern for the short-circuited loading condition of line 10, 11 at the corresponding wave length. This adjustment of the several scales need be made only once. Thereafter, the impedance of the antenna may be conveniently and quickly measured as many times as desired at the selected wave lengths.

Since slot 12 of the outer conductor of line 10, 11 is slightly longer than one-half the longest operating wave length of the apparatus, a voltage minimum point of the standing-wave pattern established for the short-circuited condition at any given wave length always occurs within the length of the slot. However, it is not always centrally located but may occur near the end of the slot, as shown by broken-line curve C of Fig. 3. Where this condition is encountered, the wave length scale may be moved along its carriage 55 to bring the centrally located zero calibration point in alignment with this reference. However, unless carriage 55 is unusually long, one end of the scale projects beyond the carriage into the path of one of brackets 56 and 57 and prevents rotation of the carriage as required in making a series of measurements over a range of wave lengths. For this reason, a scale having a length substantially less than that of the carriage, of the type represented in the enlarged view of Fig. 4, is preferred.

The scale of Fig. 4 has two series of calibrations for a particular wave length. The calibrations of one series are inversely printed with respect to the other so that only one is clearly legible for a given positioning of the scale upon the carriage. The positioning of Fig. 4 is especially useful for the loading condition illustrated by curve C of Fig. 3 since it locates zero calibration points of the lower series of scale markings close to the reference point of the standing-wave pattern. Where this scale is to be used for the loading condition of curve A of Fig. 3, it is inverted on the carriage to place the zero-center series in reading position. Also, indicator 50 is constructed to cover a substantial part of the inverted scale to prevent any confusion resulting from the duplex characteristic. While the calibrations are shown in terms of electrical degrees, it will be apparent that they may as well be in per cent. wave length.

Fixed scale 48 may be calibrated in terms of centimeters and is utilized in conjunction with indicator 49 in making standing-wave measurements at wave lengths for which appropriate wave length scales are not at hand.

For the illustrated arrangement, a voltage probe or pick-up device 21 is utilized to investigate the standing-wave patterns. However, it will be understood that a magnetic pick-up may be used, if desired. With a magnetic pick-up the points of current maximum or minimum may be easily located and used in analyzing the standing-wave pattern. The expression "a pick-up device for deriving a voltage indicative of the standing wave" is used in the claims to include this alternative device.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A standing-wave measuring apparatus comprising, a guide for electromagnetic waves effective to establish a standing electric wave along its length in accordance with the load condition and operating wave length of said guide, a pick-up device electrically coupled to and supported for axial movement with reference to said guide for deriving a voltage indicative of the amplitude of the standing wave at any selected point along the length of said guide, an arrangement for providing in the vicinity of said guide a plurality of scales each of which is individually movable for longitudinal adjustment thereof and is calibrated in terms of a different operating wave length of said guide, and means for so positioning and orienting said arrangement with reference to said guide that any selected one of said scales is positioned for movement during adjustment thereof in a predetermined path parallel to that of said pick-up device.

2. A standing-wave measuring apparatus comprising, a transmission line effective to establish a standing electric wave along its length in accordance with the load condition and operating wave length of said line, a pick-up device electrically coupled to and supported for axial movement with reference to said line for deriving a voltage indicative of the amplitude of the standing wave at any selected point along the length of said line, an arrangement for providing in the vicinity of said line a plurality of scales each of which is individually movable for longitudinal adjustment thereof and is calibrated in terms of a different operating wave length of said line, and means for so positioning and orienting said arrangement with reference to said line that any selected one of said scales is positioned for movement during adjustment thereof in a predetermined path parallel to that of said pick-up device.

3. A standing-wave measuring apparatus comprising, a guide for electromagnetic waves effective to establish a standing electric wave along its length in accordance with the load condition and operating wave length of said guide, a pick-up device electrically coupled to and supported for axial movement with reference to said guide for deriving a voltage indicative of the amplitude of the standing wave at any selected point along the length of said guide, a carriage mounted in the vicinity of said guide and supporting a plurality of scales each of which is individually movable for longitudinal adjustment thereof and is calibrated in terms of a different operating wave length of said guide, and means for so positioning and orienting said carriage with reference to said guide that any selected one of said scales is positioned for movement during adjustment thereof in a predetermined path parallel to that of said pick-up device.

4. A standing-wave measuring apparatus comprising, a guide for electromagnetic waves effective to establish a standing electric wave along its length in accordance with the load condition and operating wave length of said guide, a pick-up device electrically coupled to and supported for axial movement with reference to said guide for deriving a voltage indicative of the amplitude of the standing wave at any selected point along the length of said guide, a carriage mounted in the vicinity of said guide and having on its periphery a plurality of longitudinally extending channels for supporting in adjustably fixed positions therealong a corresponding plurality of scales each of which is calibrated in terms of a different operating wave length of said guide, and means for so orienting said carriage with reference to said guide that any selected one of said scales is adjustably positioned for movement in a predetermined path parallel to that of said pick-up device.

5. A standing-wave measuring apparatus comprising, a guide for electromagnetic waves including a slotted conductor and effective to establish a standing electric wave along its length in accordance with the load condition and operating wave length of said guide, a pick-up device projecting through said slot so as to be coupled electrically to said guide and supported for movement along said slot for deriving a voltage indicative of the amplitude of the standing wave at any selected point along the length of said slot, an indicator for indicating the position of said pick-up device along said slot, an arrangement for providing in the vicinity of said guide a plurality of scales each of which is individually movable for longitudinal adjustment thereof and is calibrated in terms of a different operating wave length of said guide, and means for so positioning and orienting said arrangement with reference to said guide that any selected one of said scales is positioned for registration with said indicator and for movement during adjustment of said selected scale in a path parallel to said slot.

6. A standing-wave measuring apparatus comprising, a guide for electromagnetic waves including a conductor having a longitudinal slot and effective to establish a standing electric wave along its length in accordance with the load condition and operating wave length of said guide, a pick-up device projecting through said slot so as to be coupled electrically to said guide and supported for movement along said slot for deriving a voltage indicative of the amplitude of the standing wave at any selected point along the length of said slot, an indicator for indicating the position of said pick-up device along said slot, a rotatable carriage having a length substantially exceeding that of said slot and mounted in the vicinity of said guide for supporting in parallel relationship to said slot a plurality of scales each of which is individually movable for longitudinal adjustment thereof, is calibrated in terms of a different operating wave length of said guide and has a length substantially less than that of said carriage, and means for rotating said carriage to position any selected one of said scales in registration with said indicator and for movement during adjustment thereof along said carriage in a path parallel to said slot.

7. A standing-wave measuring apparatus comprising, a guide for electromagnetic waves including a conductor having a longitudinal slot at least as long as one-half of any desired operating wave length and effective to establish a standing electric wave along its length in accordance with the load condition and operating wave length of said guide, a pick-up device projecting through said slot so as to be coupled electrically to said guide and supported for movement along said slot for deriving a voltage indicative of the amplitude of the standing wave at any selected point along the length of said slot, an indicator for indicating the position of said pick-up device along said slot, a rotatable carriage having a length substantially exceeding that of said slot and mounted in the vicinity of said guide for supporting in parallel relationship to said slot a plurality of scales each of which is individually movable for longitudinal adjustment thereof and is calibrated in terms of a different operating wave length of said guide, and means for rotating said carriage to position any selected one of said scales in registration with said indicator and for movement during adjustment thereof along said carriage in a path parallel to said slot.

8. A standing-wave measuring apparatus comprising, a guide for electromagnetic waves effective to establish a standing electric wave along its length in accordance with the load condition and operating wave length of said guide, a pick-up device electrically coupled to and supported for axial movement with reference to said guide for deriving a voltage indicative of the amplitude of the standing wave at any selected point along the length of said guide, a carriage disposed in the vicinity of said guide, a plurality of spaced retaining means on said carriage for supporting a plurality of scales each of which is immovable laterally but individually movable for longitudinal adjustment thereof and is calibrated in terms of a different operating wave length of said guide, and means for so positioning and orienting said carriage with reference to said guide that any selected one of said scales is positioned for movement during adjustment thereof in a predetermined path parallel to that of said pick-up device.

9. A standing-wave measuring apparatus comprising, a guide for electromagnetic waves including a conductor having a longitudinal slot and effective to establish a standing electric wave along its length in accordance with the load condition and operating wave length of said guide, a pick-up device projecting through said slot so as to be coupled electrically to said guide and supported for movement along said slot for deriving a voltage indicative of the amplitude of the standing wave at any selected point along the length of said slot, an indicator for indicating the position of said pick-up device along said slot, a rotatable carriage mounted in the vicinity of said guide, retaining means axially aligned and peripherally spaced on said carriage for supporting in parallel relationship to each other and to said slot a plurality of scales each of which is individually adjustable in said retaining means only axially of said carriage and is calibrated in terms of a different operating wave length of said guide, and means for rotating said carriage to position any selected one of said scales in registration with said indicator and for adjustable movement along said retaining means in a path parallel to said slot.

DAVID DETTINGER.

REFERENCES CITED

The following references are of record in the file of this patent:

UNITED STATES PATENTS

| Number | Name | Date |
| --- | --- | --- |
| 824,532 | Dunn | June 26, 1906 |
| 1,842,662 | Devlin | Jan. 26, 1932 |
| 2,101,296 | Simpson et al. | Dec. 7, 1937 |
| 2,106,713 | Bowen | Feb. 1, 1938 |
| 2,132,094 | Brodton | Oct. 4, 1938 |
| 2,191,271 | Carter | Feb. 20, 1940 |

OTHER REFERENCES

"Practical Analysis of Ultra High Frequency," by Meagher and Markley, published by R. C. A. Service Company, Inc., Camden, N. J., Aug. 1943, pages 12 and 20.